(12) United States Patent
Gimpel et al.

(10) Patent No.: US 6,723,946 B1
(45) Date of Patent: Apr. 20, 2004

(54) MULTICELL REACTORS

(76) Inventors: Rod F. Gimpel, 1521 Desert Springs Ave., Richland, WA (US) 99352; Dennis J. Cravens, P.O. Box 1317, Cloudcroft, NM (US) 88317; John S. Frick, 2311 Old Dutch Rd., Little Mountain, SC (US) 29075; Vince F. Golubic, 127 Parkhurst La., Allen, TX (US) 75013; Dennis G. Letts, 12015 Ladrido La., Austin, TX (US) 78727

( * ) Notice: Subject to any disclaimer, the term of this patent is extended or adjusted under 35 U.S.C. 154(b) by 116 days.

(21) Appl. No.: 09/597,650

(22) Filed: Jun. 20, 2000

(51) Int. Cl.[7] .............................................. B23K 10/00
(52) U.S. Cl. ........................ 219/121.52; 219/121.59; 219/121.48; 204/241; 204/252
(58) Field of Search ....................... 219/121.52, 121.59, 219/121.45, 121.36, 121.39; 373/18–22; 204/241, 266, 252, 278

Primary Examiner—Mark Paschall
(74) Attorney, Agent, or Firm—John F. Bryan

(57) ABSTRACT

An electrolytic reactor system for producing non-joule heat has a plurality of small cells arranged in an interconnected array, wherein each cell is characterized by having a relatively small cathode separated from a relatively large anode by a small gap, with the cells immersed in an electrolytic bath.

25 Claims, 8 Drawing Sheets

Cross Section 7-A

Shown Twice
Actual Size

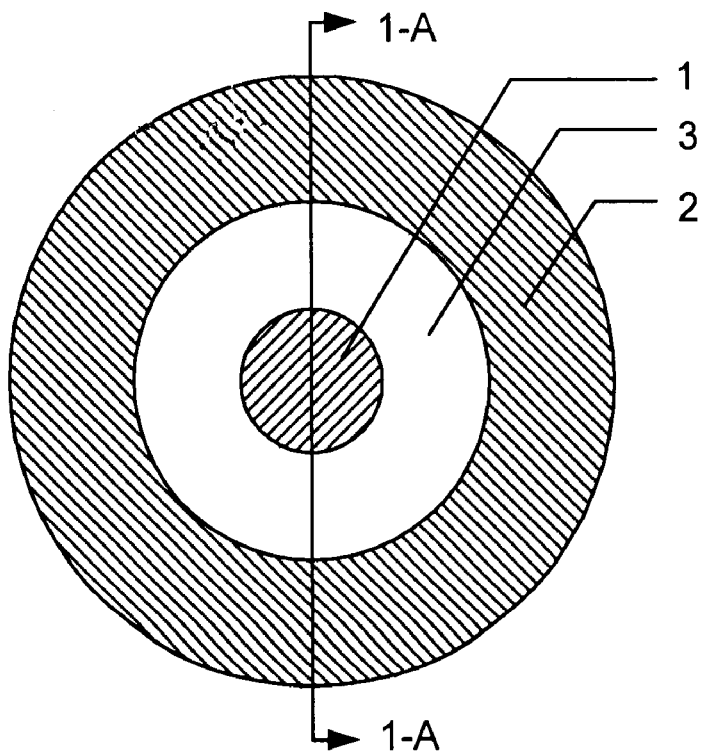
Plan View
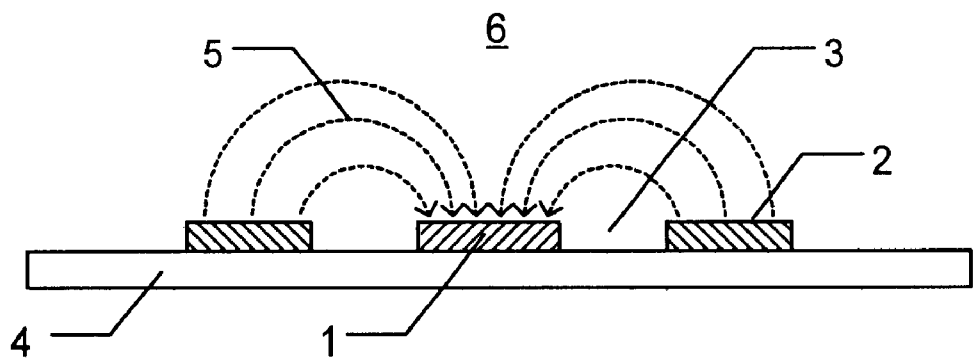
Cross Section 1-A
FIG. 1

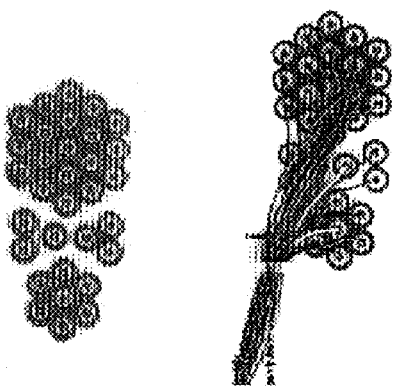

FIG 2a      FIG 2b

5    The above shows scanned images (FIG 2a and 2b shown full-size) of a basic reactor unit (MultiCell unit) and how they can be grouped together in clusters. The MultiCell clusters shown are made of copper on a glass-epoxy substrate. Shown are 1, 2, 3, 7, and 19-cell clusters. FIG 2b shows how the clusters are wired so each MultiCell unit can be powered separately for monitoring purposes. An empirical graph, showing the flux for each of the above the clusters, is shown below.

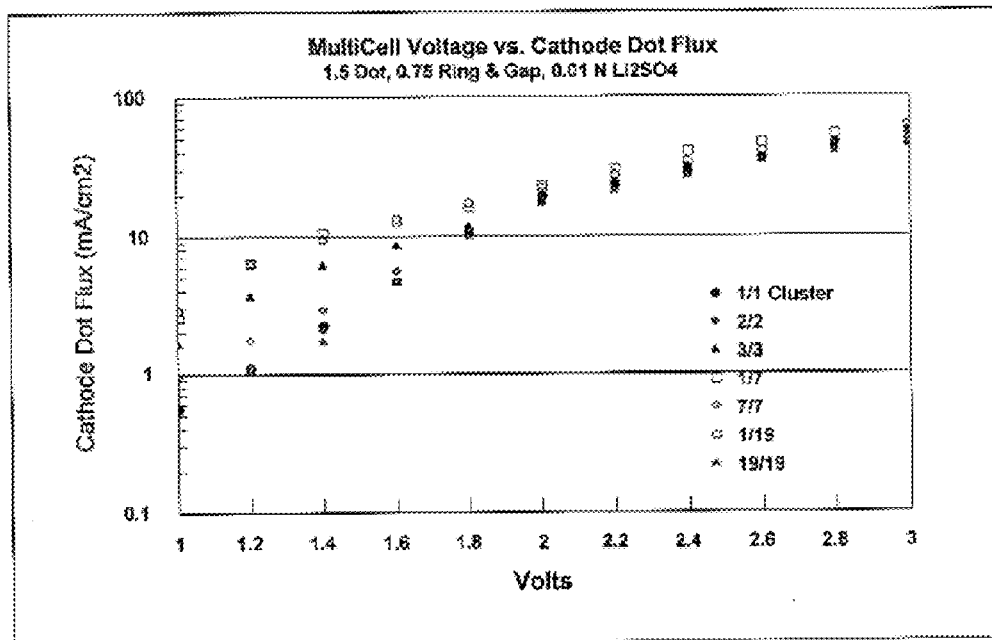

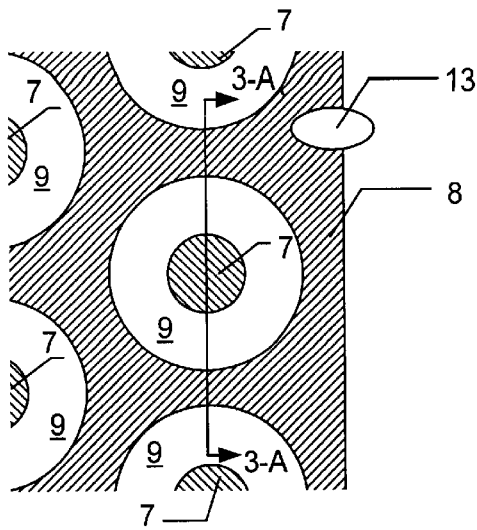
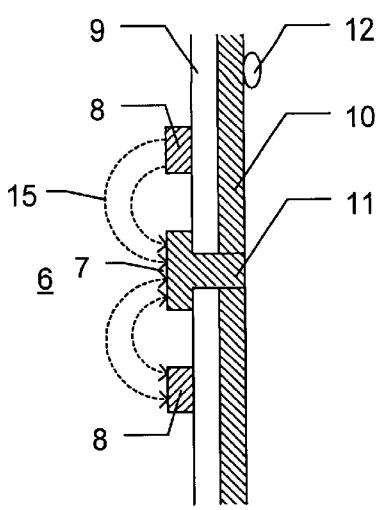
Cross Section 3-A
FIG. 3
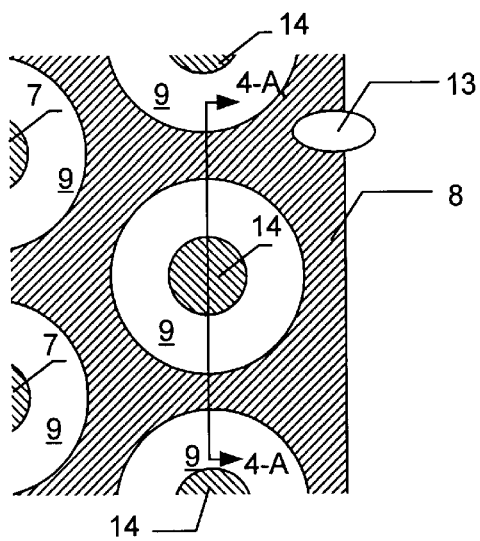
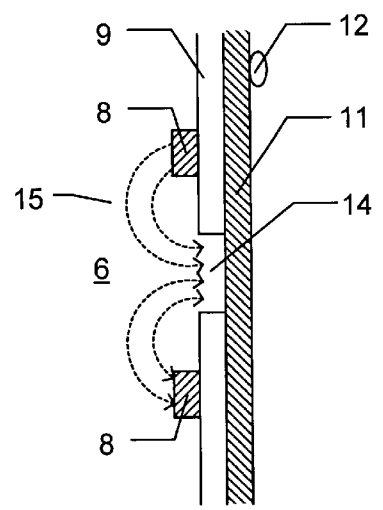
Cross Section 4-A
FIG. 4

Cross Section 5-A

Cross Section 6-A Is The Same As 5-A

Actual Pattern on Substrate -- Shown full size

Blue Glow

Charged-Particle
Boundary-Layer

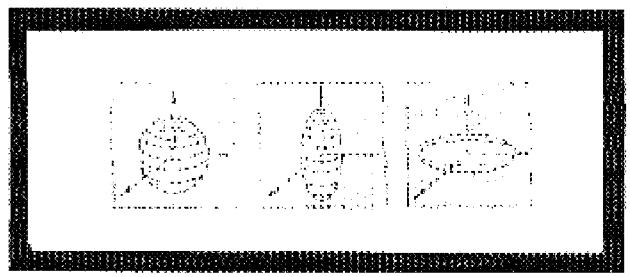
Palladium Chloride Ink-Jet Pattern on Substrate (full size) — FIG 11
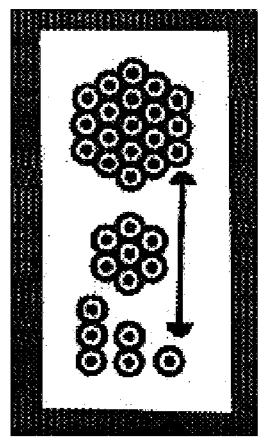
Reduced Palladium Black (metal) On Substrate (full size)
FIG 12
Electroless Nickel Metal Plated Onto Palladium Black Catalyst (full size)
FIG 13
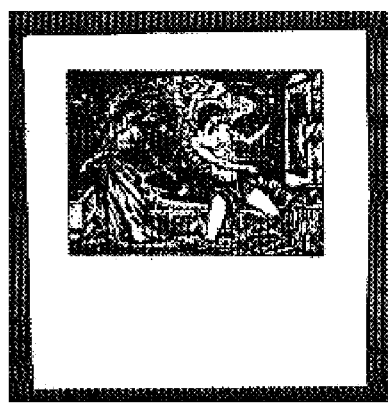
Palladium On Substrate (full size) — FIG 14

MULTICELL REACTORS

CROSS-REFERENCE TO RELATED APPLICATIONS

U.S. Patent Office Disclosure Documents No. 437867 (filed May and stamped Jun. 12, 1998), entitled *MultiCell Reactors*, documents the conception of the invention in the winter of 1997. Different configurations of the invention were documented in U.S. Patent Office Disclosure No. 454163 (filed February and stamped Apr. 15, 1999) entitled *Surface-Flux MultiCell Reactors*. Since then embodiments of the invention have been demonstrated. Methods for constructing MultiCell is given in Disclosure Document No. 446749 (filed October and stamped Nov. 2, 1998), entitled *Metal-Film Patterns Produced by Ink-Jet and Metal-Reduction Processes*.

FIELD OF THE INVENTION

This invention generally relates to reactors, and more particularly to a thermo-electrochemical reactor where stored potential energy is activated by electrical charge.

BACKGROUND—PRIOR ART

Batteries and electrolytic cells are two different types of electrochemical reactors. Batteries combine chemicals and convert potential chemical energy to electricity. Whereas, electrolytic cells use electricity to produce metals (e.g., copper and sodium) and gases (e.g., hydrogen and chlorine). Neither batteries nor electrolytic cells have historically produced large quantities of heat. In general, heating results from the joule heating of the electrolyte.

OBJECTS OF THE INVENTION

It is therefore the object of this invention to utilize a reactor of MultiCell type construction for the efficient production of non-joule heat.

It is yet another object of this design to reduce the overall resistances within the reactor to reduce nonproductive joule heating and increase fluxes so that more of the voltage drop around the surface of the cathode to encourage efficient heating.

It is yet another object of this design to encourage efficient heating by further increasing the voltage overpotential near the surface of the cathode via inducing a charged-particle boundary layer at the cathode.

It is yet another object of the invention to promote quick charging and production of non-joule heat by using a small cathode size and high fluxes.

It is yet another object of this invention to demonstrate that tungsten, nickel, platinum and other possible electrically conductive materials can work as cathode materials.

It is yet another object of this invention demonstrate that platinum and other possible electrically conductive materials can work as anode materials.

It is yet another object of this invention to supply hydride or hydrogen ion ($H^+$) forming electrolyte to complete the electrical circuit between the anode and cathode.

It is yet another object of this design to utilize a reactor of MultiCell type construction having a small cathode, large anode, small gap, and of arrangement to focus and channel fluxes, etc. that are capable of repetitive replication within a reactor for increased total power output.

It is yet another object of this invention to show that the anode and cathode patterns can be made by etching, plating, and other mechanical methods.

It is yet another object of this invention to show that the anode and cathode patterns can be made by a unique method of printing the patterns with an ink-jet printer apparatus.

It is yet another object of this invention to show that the anode and cathode patterns can be made by yet another unique method of using a metal-compound paint that reduces to the metal via application of heat.

It is yet another object of this invention to show that further metal can be plated on the patterns mentioned above by electroplating methods and selective plating can be accomplished by applying current only to parts of the pattern.

It is yet another object of this invention that the heat will be in the useful form of heated or boiling water-based electrolyte solution and steam.

SUMMARY OF THE INVENTION

The present invention will frequently be referred to as a "reactor" hereafter to distinguish from traditional batteries and electrolytic cells and their designs. The present invention concentrates on cathode generated heat. The desired cathodic processes occur at the surface or in boundry layers at the cathod. In this disclosure, these are referred to as "desired cathodic", "desired boundry layer" or "non-joule" heating processes or reactions.

The present invention discloses various embodiments that provide high electron ($e^-$) and hydrogen ion ($H^+$) fluxes and focus these fluxes around the cathode electrode. The high fluxes can quickly produce and maintain a high equilibrium concentration of hydrogen and hydride(s) near the surface of the cathode, which is considered to be important in the production of large quantities of useful heat that will be referred to as "efficient heating" hereafter. The high current (electron flux) and the high hydrogen-ion recombination rate near the surface substantially increase the voltage overpotential and can exponentially increase internal pressures near the surface of the cathode which also encourage efficient heating. The invention configurations presented concentrate fluxes by focusing fluxes through narrow bridgeways, forcing a collection of fluxes to pass through common channels, and/or passing the fluxes through thin layers of electrically conductive material at the surface. The high fluxes allow rapid heat production with essentially no charge-up time (seconds or less).

Desired conditions for efficient heating are considered to be (1) high electron flux, (2) high hydrogen-ion (proton) flux, and (3) high voltage overpotential around the electrode surface to produce high hydrogen recombination pressures that drive the reactions. The present invention does this while reducing less productive, joule-heating (resistance heating) losses in the cell. Joule-heating losses increase exponentially to the formula in Equation 1.

$$P_{joule\ heating} = V^2/R \qquad \text{(Equation 1)}$$

Where:

$P_{joule\ heating}$ is joule-heating losses

V is the overall voltage across the cell

The joule-heating losses are exponential and can easily overshadow desired heating processes in the reactor. However, and fortunately, if enough voltage (depending system internal resistances) is applied and the current (electron flux) is high enough, a gaseous or a charged-particle (plasma) boundary layer develops at the electrode's surface. Formation of the boundary layer is characterized by a blue glow at the electrode and a sharp increase in the overall resistance of the cell (e.g., amperage drops with increased voltage). This resistance via the charged-particle region directs more of the voltage drop around the surface of the cathode, which can increase more of the desired overpotential near the surface of the cathode. The present invention further takes advantage of the phenomena by reducing cell resistance and forcing voltage drop (with the desired fluxes) around the electrode surface, where it is desired. These combinations, in the case of the invention, appear to overcome the joule-heating losses and allows for more efficient heating.

Noting the above-described scenarios, a reactor's design should be designed for the lowest voltage possible and have most of the voltage drop near the surface of the cathode. This implies making significantly smaller cathodes and larger anodes than used in standard cells and moving the anodes and cathodes closer together. This increases the efficiency, but the total output may decrease because of the smaller cathode. However, putting multiple cells in parallel can offset this. Also, for economical reasons and even greater efficiency, the cells are designed as compact units for mass production much like a printed circuit board.

The present invention, also referred to as MultiCell hereafter, because the unique design of a "single" MultiCell (or a MultiCell unit) takes credit for efficiencies due, in part, to its small size but, again because its unique design, allows repetitive replication of the unit (much like a component on a circuit board or computer chip) to acquire the desired power output. MultiCells have been immersed in an electrolyte bath to produce boiling water. Demonstrations were performed with common electrolytes (e.g., $K_2CO_3$) and ordinary water. The inventor has demonstrated MultiCells that produce more useful heat than equivalent applied electrical power.

This invention is directed to a reactor design and a unique way of electrolyzing and heating water containing a conductive salt in solution. The reactor requires a non-conductive housing to hold the solution and allow immersion of the reactor components. The reactor housing and solutions may house a single reactor unit (or referred to a MultiCell unit) or plurality of reactor units to increase total power of the reactor. Each unit consists of a cathode, which is small with little surface area, and its surface is small in comparison to the anode to increase current and proton (hydrogen ion, $H^+$) density at the cathode and reduce overall joule-heating losses in the reactor. Also, the high proton flux helps maintain a high-hydrogen or hydride concentration near the surface of the cathode. FIG. 1 shows a basic MultiCell configuration and its expected electrical current flow patterns. Also, a part of the unique design is a narrow gap between the cathode and anode. This narrow gap reduces losses due to joule heating and concentrates more of the voltage drop near the surface of the cathode where it is desired. Also, the general small size (surface area and thinness) of the unit reduces the paths and length of paths outside the region of the electrodes and concentrates the voltage drop and hydride production around and near the surface of the cathode where it is desired. Circles are shown in FIG. 1 because they produce the simplest design and produce the highest proton flux near the cathode surface. FIG. 2 shows how a plurality reactor units can and have been clustered together to increase power. Note how each reactor unit has its own cathode, but shares common anode area. This arrangement allows for better consolidation and easier construction. Also, notice that the anode is thinner along the outside perimeter of the cluster. This is done so each cathode receives equal voltage and current as demonstrated through experimentation. Included in FIG. 2 is a graph that shows the flux at the cathodes as a function of voltage and number of MultiCell units in a cluster. Notice that the flux is high even at 3 volts and appears to be rather uniformly spread between cathodes.

Two different constructions to deliver power to reactor's cathodes and anodes are shown in FIG. 3 and FIG. 4. These designs lend themselves to circuit-board or computer-chip type construction.

The design has been applied to other geometries as well. These designs may not allow as high a flux over the entire cathode surface, but allow focusing of fluxes or the passing of fluxes through common bridgeways, and thus, producing hot spots. Also, this design can be easier to construct for experimental development purposes. FIG. 5 through FIG. 7 shows non-circular designs that tend to concentrate fluxes toward the connecting base of the electrode. (Note: this is where most of the test runs have failed due to erosion and is no surprise. Further development should overcome this problem.) Most of the experimental data and detailed description in this patent are of this type design. Notice that in FIG. 6 the fluxes are forced to funnel through pinch points and all the fluxes need to pass through a common region (disc) next to the cathode collector. Further experiments need to be done to determine if these hot spots are beneficial or a hindrance to the overall performance of the reactor.

During operation of the MultiCell, there is a blue glow or discharge around the cathode. This glow does not happen until 50 to 100 volts are applied. The exact voltage depends on configuration, electrolyte concentration etc. While increasing voltage from zero, the current continues to increase until the blue glow appears (FIG. 9). Then the current sharply drops indicating a sharp increase in resistance. The inventor proposes that the electron flux and voltage exert just enough counter-pressure to push the electrolyte solution away from the surface of the electrode when the blue glow starts. This forms a new surface/interface where the hydrogen ions (protons, $H^+$) and electrons ($e^-$) merge and interact (FIG. 10). Further increases in voltage result in further increases in the fluxes (current) that pass through the boundary layer. This is beneficial to efficient heating reactions because of increased particle density. More importantly, the inventor also proposes that extra flux is accompanied with extra voltage overpotential (and particularly hydrogen-recombination voltage overpotential) at the interface region. Only moderate increases in the voltage are needed to greatly increase pressures at the interface since the relationship of voltage overpotential to pressure is to the $4^{th}$ power—according to Michio Enyo and Tafel theories which have been confirmed by experiment.

Even though the reactions happen near the electrode, more of the reactions do not actually happen in the surface of the electrode. This implies that the material makeup of the electrode and the electrolyte are less important. The solvent itself (water), at the said surface/interface (FIG. 10), supplies "hydride" and sites where the prescribed pressures form. In summary, the required interactions for potential energy conversion may be more conductive at the charged-particle boundary layer and its surface/interface than at the electrode because of the noticed greater voltage drop at the said boundary layer than the electrode.

This patent application is for the apparatus and methodology, not for any underlying theory. However, the invention and designs presented, herein, were conceived with the desired theory in mind. The theory is only presented to give credence to the concepts behind the invention designs described herein. Better theories may be developed that explain the efficient heating phenomena, but they do not change the results, designs, and claims documented within this Patent Application. The fact is that the MultiCell invention produces more heat than electrical power supplied and this heat comes from the conversion of some form of potential energy within the contents of the reactor housing when electrical current is applied.

OBJECTS OF THE INVENTION

It is therefore the object of this invention to utilize a reactor of MultiCell type construction for the efficient production of non-joule heat.

It is yet another object of this design to reduce the overall resistances within the reactor to reduce nonproductive joule heating and increase fluxes so that more of the voltage drop around the surface of the cathode to encourage efficient heating.

It is yet another object of this design to encourage efficient heating by further increasing the voltage overpotential near the surface of the cathode via inducing a charged-particle boundary layer at the cathode.

It is yet another object of the invention to promote quick charging and production of non-joule heat by using a small cathode size and high fluxes.

It is yet another object of this invention to demonstrate that tungsten, nickel, platinum and other possible electrically conductive materials can work as cathode materials.

It is yet another object of this invention demonstrate that platinum and other possible electrically conductive materials can work as anode materials.

It is yet another object of this invention to supply hydride or hydrogen ion ($H^+$) forming electrolyte to complete the electrical circuit between the anode and cathode.

It is yet another object of this design to utilize a reactor of MultiCell type construction having a small cathode, large anode, small gap, and of arrangement to focus and channel fluxes, etc. that are capable of repetitive replication within a reactor for increased total power output.

It is yet another object of this invention to show that the anode and cathode patterns can be made by etching, plating, and other mechanical methods.

It is yet another object of this invention to show that the anode and cathode patterns can be made by a unique method of printing the patterns with an ink-jet printer apparatus.

It is yet another object of this invention to show that the anode and cathode patterns can be made by yet another unique method of using a metal-compound paint that reduces to the metal via application of heat.

It is yet another object of this invention to show that further metal can be plated on the patterns mentioned above by electroplating methods and selective plating can be accomplished by applying current only to parts of the pattern.

It is yet another object of this invention that the heat will be in the useful form of heated or boiling water-based electrolyte solution and steam.

BRIEF DESCRIPTION OF DRAWINGS AND SCANNED IMAGES

FIG. 1 shows a plan view and a cross-sectional view of the electrodes in a basic reactor unit referred to as a MultiCell unit. This is a basic circular design.

FIG. 2 shows how a basic reactor unit (MultiCell unit) can be grouped together in clusters. Shown are 1, 2, 3, 7, and 19-cell clusters. Also, shown is an empirical graph showing the measured flux at the cathodes as a function of applied voltage and number of MultiCell units in a cluster.

FIG. 3 shows a plan view and a cross-sectional view of a construction of and interconnection of circular reactor units with cathodes connected from underneath.

FIG. 4 shows a plan view and a cross-sectional view of a construction of and interconnection of circular reactor units with a cathode valley used for the cathode(s).

Figure 6A:
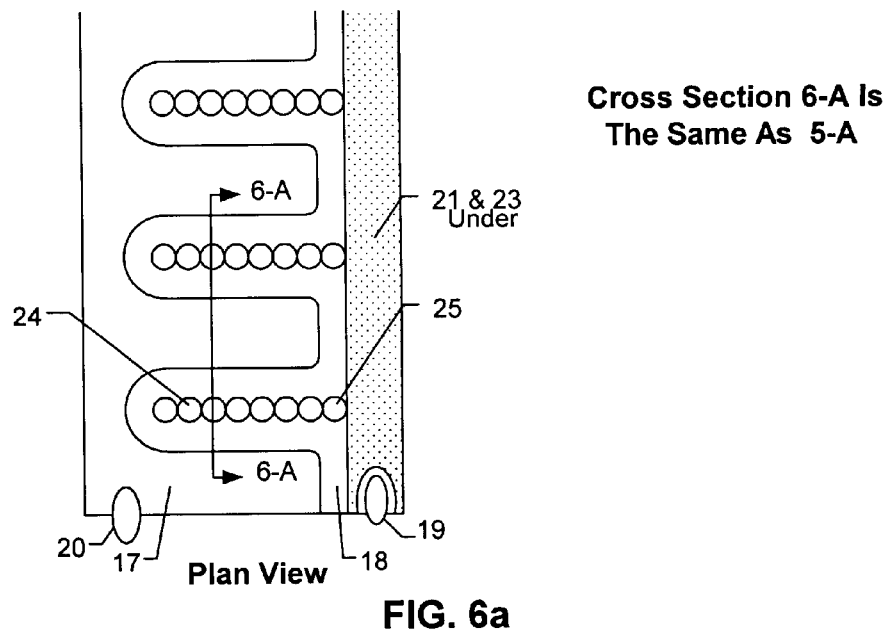
Figure 6B:
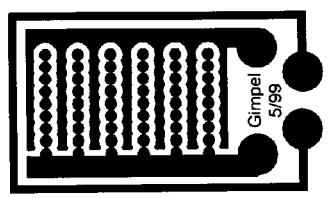

FIG. 6 shows a plan view and cross-sectional view of a construction of and interconnection of non-circular reactor units with the cathode(s) consisting of a collection of discs in a row. Electrode connections are made on the surface. A scanned image of a non-circular configuration is also shown.

Figure 7:
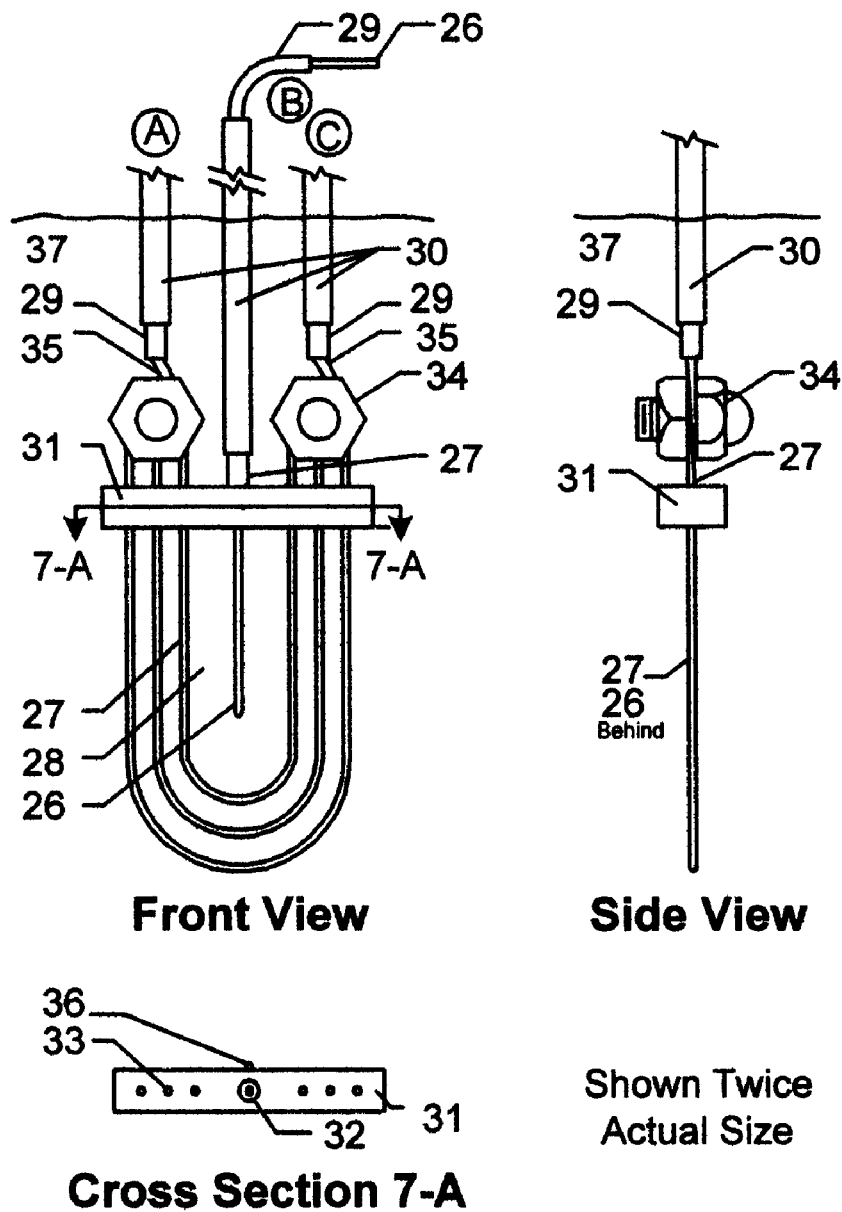

FIG. 7 shows a plan view and cross-sectional view of a construction and connection of a non-circular reactor unit with the electrodes constructed of metal wires. Most of the test-run data comes from this embodiment.

Figure 8:
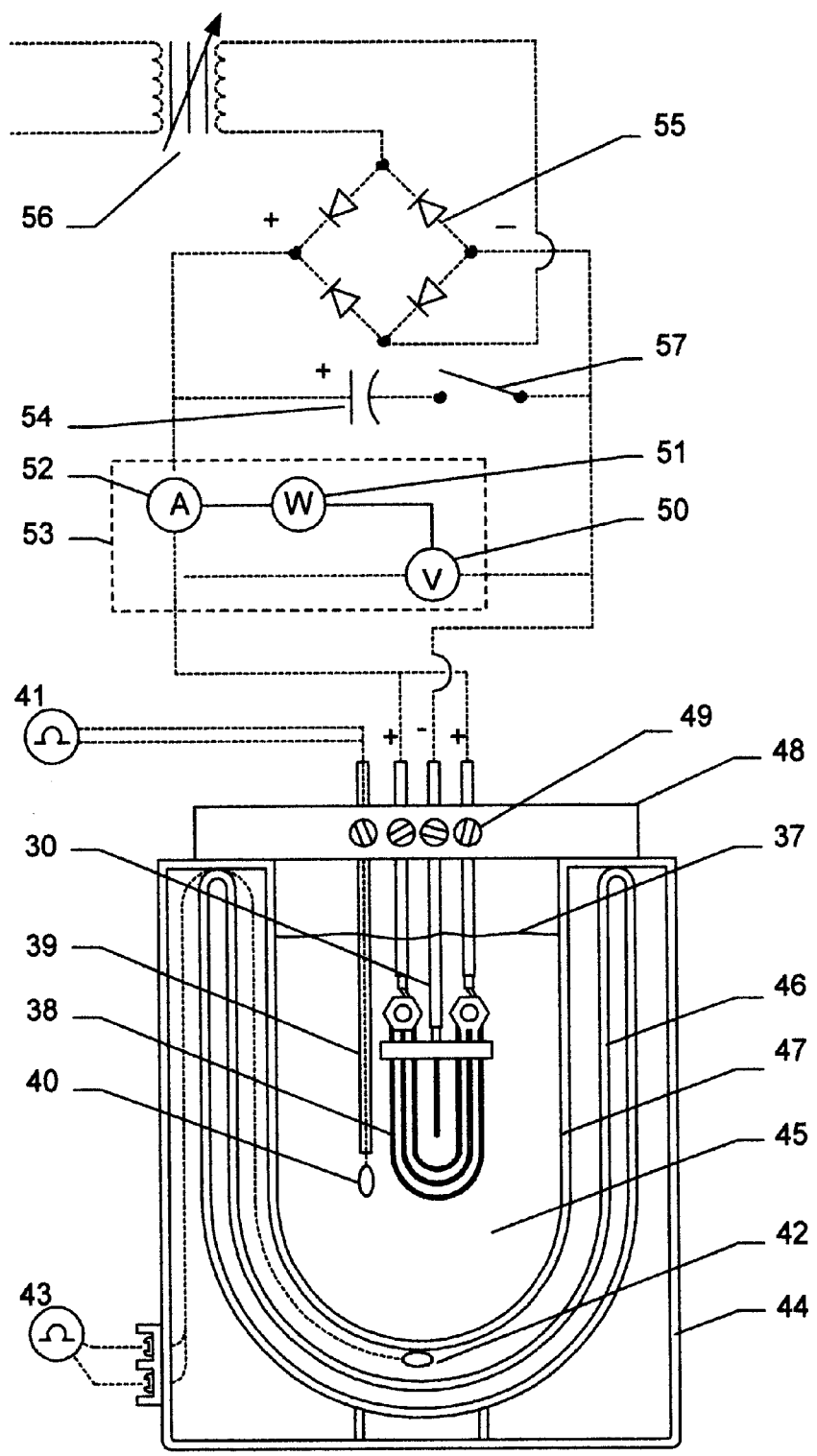

FIG. 8 shows the reactor with housing, power supply, and calorimetry used to perform test runs.

Figure 9:
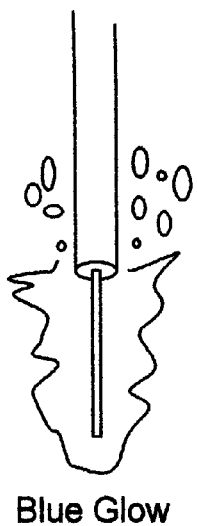

FIG. 9 shows a blue glow sketch.

Figure 10:
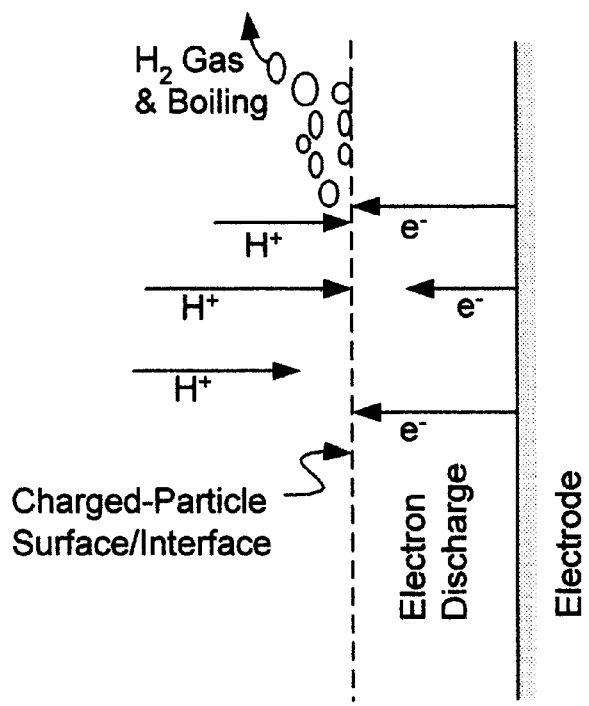

FIG. 10 shows a charged-particle interface/surface sketch.

FIG. 11 shows a scanned image of palladium chloride ink-jet pattern on a substrate.

FIG. 12 shows a scanned image of reduced palladium back (metal) on a substrate.

FIG. 13 shows a scanned image of electroless nickel metal plated onto palladium black catalyst.

FIG. 14 shows a scanned image of palladium on a substrate.

DETAILED DESCRIPTION OF THE INVENTION

Reactor Embodiments

Referring now to the drawings and particularly to FIG. 1, which shows the basic embodiment of the reactor unit (or also referred to herein as a MultiCell unit) of the invention. The heart of the MultiCell unit is a cathode. Numeral 1. The cathode consists of an electrically conductive material that remains electrically conductive via its inertness to the cell's environment or processes or via formation of an electrically conductive hydride layer at the cathode's surface. Further discussion of cathode materials and configurations are presented later in a subsection entitled "Cathode Materials and Configurations." The cathode is generally small in size, e.g., 0.1 to 0.5 cm in diameter or the area thereof (e.g., 0.008 to 0.8 $cm^2$). The anode 2 is larger than the cathode. Generally, an anode is several times larger to better reduce the overall cell resistance and force more of the voltage drop nearer to the cathode surface. The anodes need to electrically conductive material that can withstand the harsh oxidizing environment. Platinum is used is such environments. Because of platinum's high expense, anodes have historically been limited in size. Other less expensive materials (e.g., graphite, bismuth, tantalum, etc.) will be investigated. However, since the invention requires large surface area anodes, the anodes do not have to carry high fluxes like the cathode and can be made of relatively thin material or plated material. The gap 3, between the cathode and anode, is narrow to help further reduce the overall cell resistance and force more of the voltage-drop nearer the surface of the cathode. The test runs were performed with a cathode area of approximately 0.16 cm² and an anode area of about 10 cm². However, the design for the test runs was of a non-circular design shown in FIG. 7. The substrate 4 is of nonconductive material and its purpose is to hold the cathodes in place. However, a substrate is not necessary if other means are used to position the electrodes (as is shown in FIG. 7) where the electrodes are held in place at the base and the electrode material is stiff enough to hold its shape during operation. Returning to FIG. 1, lines of flux 5 are shown emerging from the cathode, passing through the electrolyte 6, and finally concentrating on the surface of the cathode in the center of the reactor unit. Optimizing a cell is discussed in a later section entitled, "Cell Optimization."

The small unit size of the invention is designed to increase the efficiency of the reactor unit, but the output may be lower than desired. The invention is designed to increase the total reactor by grouping the reactor units together in units called clusters. FIGS. 2a and 2b show how a plurality of reactor units can and have been clustered together to increase power. Note how each reactor unit has its own cathode, but shares a common anode area. This arrangement allows for better consolidation and easier construction. Also, notice that the anode is thinner along the outside perimeter of the cluster. This is done so each cathode receives equal voltage and current as demonstrated through experimentation.

FIG. 3 and FIG. 4 show two methods of making the plurality of reactor units basically from plate stock or films. The small cathodes 7 appear as dots in the plan view of FIG. 3 and FIG. 4. The gaps are shown around each dot and the anodes are shown as the remainder of the surface area. The cathode dot or plateau 7 in FIG. 3 is positioned on the substrate 9 and connected to the cathode collector 10 via an electrically conductive contactor 11. The inventor has drilled small holes into the cathode dots and connected each with small-diameter wire. This was the method to obtain the empirical data presented in FIG. 2. The cathode in FIG. 4 is actually the exposed portion of the cathode collector 10 and is called a cathode valley 14. The positive (+) side of direct current (DC) power is applied to the anodes 8 via connection 13. The negative side of the DC power is applied at to the cathode collector 10 via connection 12. The whole assemblies shown in FIG. 3 and FIG. 4 are immersed in an electrolyte. Fluxes 15 are shown emerging from said anode 8 and concentrating at the surface of said cathode dot 7 or said cathode valley 14.

Figure 5:
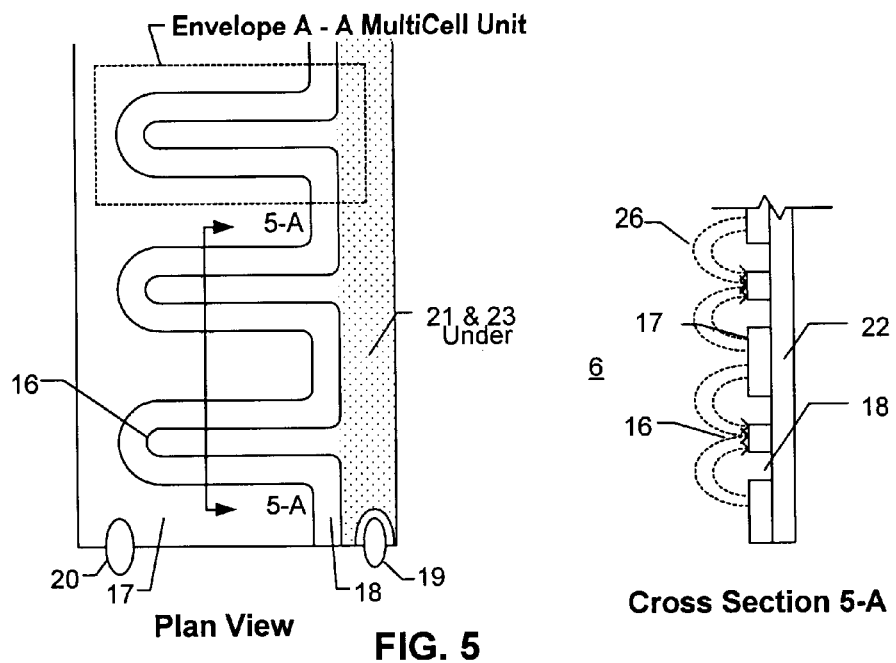
FIG. 5 shows a plan view and a cross-sectional view of a construction of and interconnection of non-circular reactor units with electrode connections made on the surface.

FIG. 5 and FIG. 6 show non-circular designs. The components of these are similar to the circular designs, except cathode 16 in FIG. 5 is long and slender and cathode 24 in FIG. 6 is also long and slender, but is constructed of touching dots in a row. Notice that all fluxes must flow through the base of the cathode and particularly the last dots 25 of cathode 24. The design of these MultiCell configurations helps simplify the interconnection of the anodes 17 and the cathodes 16 and 24 because they can be put on the same surface of the substrate 22. The cathode collector is actually an extension of the cathode (16 or 24) material a nonconductive material placed over the said collector 23 and prevents its interaction with the electrolyte solution 6. Electrical contacts are made at connection 20 for positive and connection 19 for negative. A probable flux pattern 26 across gap 18 is shown.

The basic patterns in FIGS. 1 through 6 can be etched, cut, or drilled into a plate of anode stock (e.g., 8), cathode collector stock (e.g., 10), and substrate material (e.g., 9) and then connected together. Or, it can be done (as the inventor has developed) by placing a reduced metallic palladium catalyst on the surface in the desired pattern and then using electroless plating solutions to plate the desired metals (e.g., 7, 8, 14, 16, 17, 23, and 24) on the surface the surface of the substrate (e.g., 9 and 10). This method has been used to plate layers of alternating dissimilar electrically conductive materials for the cathode (e.g., nickel and palladium) by the inventor.

The present inventions' two distinct embodiments both provide high electron (e−) and hydrogen ion (H+) and/or Deuteron ion (D+) fluxes. A thin films planar embodiment as indicated in FIG. 1 through FIG. 6 and secondly, a plasma embodiment as described in FIG. 7 though FIG. 10 serve to focus these fluxes around the cathode electrode(s). In both embodiments, high fluxes can quickly produce and maintain a high equilibrium concentration of hydrogen and hydride(s) near the surface of the cathode, which is considered to be important in the production of large quantities of "efficient heating". The high current (electron flux) and the high hdyrogen-ion recombination rate near the surface of both embodiments substantially increase the voltage overpotential which can exponentially increase internal pressures near the surface of the cathode, which also encourage efficient heating allowing rapid heat production with essentially no charge-up time (seconds or less).

The thin films planar embodiments presented concentrate fluxes by focusing fluxes through narrow bridgeways, forcing a collection of fluxes to pass through common channels, and/or passing the fluxes through thin layers of electrically conductive material at the surface. The plasma embodiment also produces high fluxes, however when the blue plasma glow appears, the electron flux and voltage exert just enough counter-pressure to push the electrolyte solution away from the surface of the electrode. This forms a new surface/interface where the hydrogen ions (protons, H+) and electrons (e−) merge and interact as in FIG. 10. Further increases in voltage result in further increases in the fluxes (current) that pass through the boundary layer also encouraging efficient heating.

Cathode Materials and Configurations

The cathode materials used thus far in experiments have been copper, nickel, tungsten, palladium, and platinum. The ones documented in Testing and Experimental Results Section of this Patent Application nickel, tungsten, and platinum gave good results. However, almost any electrically conductive material, e.g., titanium, uranium, graphite, iridium, osmium, or bismuth may give better performance or longer durability and will be tried in later experimentation. Likewise, cathode material surface lattice, texture, structure and impurities will be investigated to see if efficiency can be increased. Also, the more expensive, but durable material could be plated onto less expense material. The best performers may be deposits of alternating thin layers of dissimilar electrically conductive materials, e.g., palladium and nickel. An alternate to the flat cathodes is to replace each cathode with a bead made from electrically conductive materials mentioned above. A bead with a center hole would be desired for mounting. The end of a wire may be effective and beneficial because it could be fed into the MultiCell as worn. Also, the Cathode Valley 14 shown in FIG. 4 could be filled with a porous media of to increase the amount of reactive material(s).

Cell Optimization

Electrolyte concentration needs to be optimized to obtain the correct balance. For example, if the electrolyte concentration is high (assumed to be helpful), the charged-particle boundary layer forms at higher voltage (which is assumed to be less productive) but higher amperage (which is assumed to be more productive). Likewise, the size of the cathode, ratio of anode to cathode, size of gap, cathode material and morphology need to be optimized to produce the most heating for input power. Likewise again, the amount of applied voltage, charged-particle boundary layer, current, and quality of the input power (e.g., steady DC, oscillating, pulsed, and reactance—amount of capacitance and inductance) need to be further investigated for further optimization. Further experiments need to be done to determine if these high-amperage/high flux regions (hot spots) are beneficial or a hindrance to the overall performance of the reactor. Similarly, the materials of construction and configuration need to be further studied to produce long-lasting cells.

DISCLOSEED METHODS OF PRODUCING MULTICELL ELECTRICALLY CONDUCTIVE PATTERNS ON A NON-ELECTRICALLY CONDUCTIVE SUBSTRATE

Patterns Produced by Ink-Jet and Metal-Reduction Processes

This patent also discloses developed and demonstrated methods to efficiently and accurately produce metal patterns on electrically non-conductive materials with the use of an ink-jet printer device. The technique first uses an ink-jet printer using special inks containing soluble palladium (or other catalyzing metal) compounds to produce the desired patterns or pictures on paper or other materials. Then reducing the palladium compounds to metallic palladium develops the printed pattern. Finally, electroless (e.g., nickel, cobalt, copper, gold, platinum, palladium) plating solutions are used to deposit metal films over the metallic palladium patterns. Even though the palladium metal (or other similar material) is in low concentration, it acts as a catalyst and provides the sites needed for the electroless metal process to begin. The deposited metal then acts as its own catalyst and continues the plating process. Other layers of different metals can then be deposited on the metal patterns using standard electrolytic and/or electroless metal depositing techniques.

Example Application

The inventor used palladium chloride spiked with hydrochloric acid (HCl) to increase the palladium chloride's solubility. The inventor produced a 5 wt % (weight percent) solution to use as the ink. The ink jet, ink cartridge has to be well cleaned and free of any debris because this debris will react with the palladium chloride and cause a reduction of the effective palladium chloride concentration or cause failure of the jets. Likewise, the palladium chloride can react with the metal parts of the ink jet and plate-out palladium and plugging of the jets. Plugging has been a frequent problem, but when the ink-jet works, it produces a well-defined pattern as shown in FIG. 11 in actual size. Palladium chloride is brownish yellow. Other compounds (inorganic or organic) could be used, but they should have color. The color shows how complete and well defined printed the pattern is.

The palladium chloride ink is allowed to dry. Then the palladium chloride is reduced to the metal with a reductant (e.g., solution of hydrazine ($NH_2NH_2$)). After the palladium chloride is reduced, the metal at the microscopic level appears black as seen in FIG. 12 showing a MultiCell pattern. Microscopic palladium metal is also known as palladium black.

Then the palladium-black pattern is placed in an electroless plating solution. The palladium black acts as a catalyst and causes metal to plate out. FIG. 13 is the same as FIG. 12 with nickel being plated over the palladium black. The thin bar with half-circles on either end is used to determine how thick the metals have plated onto the substrate. Measuring the resistance between the half-circles does this. For example, the thicker the film, the lower the resistance. After, a thin layer of metal is applied by electroless plating, other metals can be applied by electroplating. This method would allow the cathodes to be plated of different material by apply current to only the cathodes during the electroplating process or via versa.

Note: These techniques could be used to efficiency produce (1) printed circuits, (2) electrical circuits, (3) art, or (4) long lasting documents/pictures easily on the computer. Palladium, gold, and platinum are noble metals and are inert, and therefore, documents printed with these could last centuries provide the paper or paper-substitute media lasts that long. An example of a picture and text is shown in FIG. 14.

Heat-reducing Metal-glaze Technique

There are manufactured glass and ceramic glazes that contain palladium; copper, silver, gold, and platinum, etc. compounds that can be applied like paint. Some even come in pens for the application of the paint. It is sometimes referred to as (1) "liquid" gold, platinum, etc. if intended for producing metal films on ceramics like materials or (2) "bright liquid" gold, platinum, etc., if intended for producing metal films on glass like materials. The inventor used Hanovia™, Engelhard™ brand. For example, Hanovia™, Bright Palladium #4334, is design specifically for plating on glass. When heated, the organic compounds in these paints reduce the metal compounds to elemental metals. Hand applying, silk-screening, or other methods can be used to apply the paints in the desired patterns to the substrate. Once the paint is dry, the piece is placed in a furnace/oven to reduce the paint to a metallic film. Appling a thinned solution of palladium paint can produce a catalyzed pattern like the above-cited technique prior to performing electroless plating. Bright Palladium #4334 works well as a catalyst diluted with toluene.

PROCESS CONTROL, TESTING AND CALIORIMETRY APPARATUS EMBODIMENTS

Reactor Design

A non-circular design was made with thicker materials as shown in FIG. 7, which is easier to construct for experimental purposes than some of the other described methods since is made from nominal 0.5-mm diameter wires. Notice that the MultiCell shown in FIG. 7 is essentially the same as one of the units in the MultiCell cluster shown inside Envelope A of FIG. 5. Most of the experimental data comes from this type MultiCell design. The cathode 26 is around 1 cm in length, which is made by exposing an end of a nominal 0.5-mm diameter wire. Different metals (elements) where tried. See Table 2 for the metals tried. The rest of the wire is insulated by Teflon® PTFE tubing (0.022" inside diameter, 0.010" wall thickness, 300 volt rated, Cole-Palmer®, Catalog No. P-06417-21, Lot No. 254786, All Teflon® tubing same specifications) 29 to prevent interaction with the electrolyte bath. The other end of the wire is connected to the negative end of the power supply (not shown). The cathode wire 26 and its Teflon® PTFE tubing are placed inside a Pyrex® glass tube for extra support and rigidity. The anode 27 is also comprised of 0.508 mm diameter platinum wire (ISA Standard Grade Thermocouple wire Type R and S) that is looped around the cathode 26 three times in manner shown is FIG. 7. The anode could be made of solid platinum plate or foil instead of three wires. The innermost loop leaves a 2-mm gap 28. A more detailed spacing of the electrodes 26 and 27 is shown in a cross section view of mounting base 31 in FIG. 7. A counter-sunk hole 32 is drilled for the cathode wire 26 and its electrically insulating Teflon® PTFE 29. The remaining holes 33 are drilled for mounting the anode loops. The anodes are connected to platinum leads wires 35 in a Nylon® nut, bolt, and washer fastener 34. The anode lead wires 35 are also insulated by Teflon® PTFE tubing 29 and which are also encased in Pyrex® glass tubing 30 for extra support and rigidity like the cathode wire 26. The three Pyrex® glass tubes 37 are mounted to a bracket (shown in FIG. 8) above the surface of the electrolyte 37. The bracket allows adjustment of the three Pyrex® glass tubes 30 up and down. The bracket also allows the extension and retraction of the cathode wire 26 within its Teflon® PTFE tubing 29.

Some of the runs were too hot and the cathode 26 melted and moved through the PTFE base 31 until it contacted the inner loop of the anode 27. In this case, the cathode 26 was moved to the position marked 36 in the cross sectional view in FIG. 7. This produced approximately a 3.5 mm gap. The cathode operated without melting the PTFE in this position. Further development and material selection should return the cathode to position 26.

Testing Apparatus

The testing apparatus is shown in FIG. 8. The MultiCell unit depicted in FIG. 7 is shown as Item 38 in FIG. 8 in the test apparatus. The container for electrolyte bath 45 and housing the MultiCell unit 38 is a Thermos® 10-ounce food jar (container). Model 7021A 44. The inside wall 47 and the outside wall of the container are made of polypropylene. Between the walls is a silvered-glass Dewar bottle 46. A thermistor 42 (Radio Shack® 10-kohm thermistor, Catalog No. 271-110A, 10 k ohms at 25° C., which is connected with thin 30-gauge Kynar® coated wrapping wire, Catalog No. 278-502) was attached to the underneath side of the inside said polypropylene wall 47 to ascertain the temperature of said wall and inner glass wall of said Dewar bottle 46. The resistance (and thus, temperature) of said thermistor 42 is measured by ohmmeter 43 (Radio Shack, Digital Multimeter, Catalog No. 22-168A). Thermistor 40 (same type as 42 but the thermistor is encased in a polypropylene tube closed at one end and the other end of the tube and thermistor Kynar® lead wire are sealed in silicone RTV to protect the thermistor) and ohmmeter 41 (Radio Shack, Digital Multimeter, Catalog No. 22-168A) measure the temperature of the electrolyte bath 45. Said thermistor 40 is held in place by Pyrex® glass tubing 39. The Pyrex® glass tubing 39 itself is held in place by a plastic bracket 48 that rests atop the open said container 44. The Pyrex® glass tubing 39 can be raised and lowered and set in place by set Nylon® screws 49; thus, said thermistor 40 and MultiCell 38 can be positioned to desired positions in the electrolyte bath 45.

A power supply was constructed to supply essentially ripple-free DC power up to 1 kilowatt between 0 and 240 volts. The power supply consists of a variable transformer 56 (AEEC 1000 watt variable transformer, 0 to 240 V AC output, 120 V AC input, Jameco® Catalog Part No. 129007) with accurate adjustment between 0 and 240 volts. A 30-amp, full-wave, bridge rectifier 55 (600 volt, Jameco® Catalog Part No. 25591) converts the AC current to a pulsed-DC current. Ten 200-volt electrolytic, 560-microfarad (NRLM Series, Jameco® Catalog Part No. 155889) capacitors, totaling 5600 microfarads 54, can be switched into the circuit, via switch 57, to give an essentially ripple free current to the MultiCell 38. Power (watts), voltage, (volts) and current (amps) delivered to said MultiCell are measured via a Clarke-Hess®, Model 256 meter (item 53), concurrently in the positions indicated 51, 50, and 52 respectively. Accurately measuring input power is very important in determining the efficiency; therefore, a rather expensive Clarke-Hess Volt-Ampere-Wattmeter was purchased. The Clarke-Hess® meter measures true watts and is waveform independent. Further details of the meter are given in Table, but more complete details are available on the Internet at web site www.clarke-hess.com.

EXHIBIT 1

MultiCell Run

Date: 02/22/00
Description Resistance Heater, Calibration Run

| a<br>Time<br>Minutes | b<br>Time<br>Hours | c<br>Voltage<br>V | d<br>Current<br>A | e<br>T bath<br>kohms | f<br>T bath<br>° C. | g<br>T Shell<br>kohms | h<br>T Shell<br>° C. | i<br>Power in<br>W, aver. | j<br>Energy in<br>kJ | Comments |
|---|---|---|---|---|---|---|---|---|---|---|
| 0.00 | 0.00 | 0.00 | 0.00 | 1.80 | 77.34 | 2.23 | 69.99 | 0.00 | 0.00 | |
| 1.00 | 0.02 | 82.70 | 1.04 | 1.92 | 75.07 | 2.31 | 68.81 | 86.01 | 2.58 | |
| 2.00 | 0.03 | 82.70 | 1.04 | 1.67 | 79.98 | 2.29 | 69.10 | 86.01 | 5.16 | |
| 3.00 | 0.05 | 82.50 | 1.04 | 1.55 | 82.64 | 2.26 | 69.54 | 85.80 | 5.15 | Bubbles form |
| 4.00 | 0.07 | 82.40 | 1.03 | 1.48 | 84.29 | 2.24 | 69.84 | 84.87 | 5.12 | |
| 5.00 | 0.08 | 82.50 | 1.03 | 1.37 | 89.76 | 2.19 | 70.60 | 84.98 | 5.10 | |
| 6.00 | 0.10 | 82.50 | 1.03 | 1.27 | 91.74 | 2.06 | 72.88 | 84.98 | 5.10 | |
| 7.00 | 0.12 | 82.40 | 1.03 | 1.18 | 93.50 | 1.92 | 75.07 | 84.87 | 5.10 | |
| 8.00 | 0.13 | 82.60 | 1.03 | 1.14 | 94.32 | 1.81 | 77.15 | 85.08 | 5.10 | |
| 9.00 | 0.15 | 82.70 | 1.03 | 1.08 | 95.99 | 1.58 | 81.96 | 85.18 | 5.11 | |
| 10.00 | 0.17 | 82.90 | 1.04 | 1.05 | 97.08 | 1.38 | 90.11 | 86.22 | 5.14 | |
| 11.00 | 0.18 | 82.80 | 1.04 | 1.01 | 98.58 | 1.17 | 93.70 | 86.11 | 5.17 | Slow boil |
| 12.00 | 0.20 | 83.10 | 1.04 | 1.00 | 98.96 | 1.12 | 94.74 | 86.42 | 5.18 | |
| 13.00 | 0.22 | 82.70 | 1.04 | 0.99 | 99.35 | 1.10 | 95.28 | 88.01 | 5.17 | |
| 14.00 | 0.23 | 83.10 | 1.04 | 1.00 | 98.96 | 1.08 | 95.99 | 86.42 | 5.17 | |
| 15.00 | 0.25 | 83.20 | 1.04 | 1.00 | 98.96 | 1.07 | 96.35 | 86.53 | 5.19 | |
| 16.00 | 0.27 | 83.10 | 1.04 | 1.00 | 98.96 | 1.06 | 96.71 | 86.42 | 5.19 | |
| 17.00 | 0.28 | 83.20 | 1.04 | 1.00 | 98.96 | 1.05 | 97.08 | 86.53 | 5.19 | |
| 18.00 | 0.30 | 83.00 | 1.04 | 1.00 | 98.96 | 1.05 | 97.08 | 86.32 | 5.19 | |
| 19.00 | 0.32 | 83.20 | 1.04 | 1.00 | 98.96 | 1.04 | 97.45 | 86.53 | 5.19 | |
| 20.00 | 0.33 | 83.00 | 1.04 | 1.00 | 98.96 | 1.04 | 97.45 | 85.32 | 5.19 | |
| 21.00 | 0.35 | 83.10 | 1.04 | 1.00 | 98.96 | 1.04 | 97.45 | 86.42 | 5.18 | |
| 22.00 | 0.37 | 83.10 | 1.04 | 1.00 | 98.96 | 1.03 | 97.82 | 86.42 | 5.19 | |
| 23.00 | 0.38 | 83.30 | 1.04 | 1.00 | 98.96 | 1.03 | 97.82 | 86.83 | 5.19 | |

EXHIBIT 1-continued

MultiCell Run

Date: 02/22/00
Description Resistance Heater, Calibration Run

| a | b | c | d | e | f | g | h | i | j | |
|---|---|---|---|---|---|---|---|---|---|---|
| Time Minutes | Time Hours | Voltage V | Current A | T bath kohms | T bath °C. | T Shell kohms | T Shell °C. | Power in W, aver. | Energy in kJ | Comments |
| 24.00 | 0.40 | 83.10 | 1.04 | 1.01 | 98.58 | 1.03 | 97.82 | 86.42 | 5.19 | |
| 25.00 | 0.42 | 83.10 | 1.04 | 1.01 | 98.58 | 1.03 | 97.82 | 86.42 | 5.19 | |
| 26.00 | 0.43 | 83.20 | 1.04 | 1.01 | 98.58 | 1.03 | 97.82 | 86.53 | 5.19 | |
| 27.00 | 0.45 | 83.20 | 1.04 | 1.01 | 98.58 | 1.03 | 97.82 | 86.53 | 5.19 | |
| 28.00 | 0.47 | 83.20 | 1.04 | 1.01 | 98.58 | 1.03 | 97.82 | 86.53 | 5.19 | |
| 29.00 | 0.48 | 83.00 | 1.04 | 1.01 | 98.58 | 1.03 | 97.82 | 86.32 | 5.19 | |
| 30.00 | 0.50 | 83.00 | 1.04 | 1.01 | 98.58 | 1.03 | 97.82 | 86.32 | 5.18 | |
| k | Total Power/Energy In: | | | | | | | 84.63 | 152.34 | |

| | | Mass g | $C_p$ or h (evap) | Units | ΔT °C. | Power Out W, aver. | Energy Out kJ |
|---|---|---|---|---|---|---|---|
| | Heat up | | | | | | |
| l | Electrolyte-Starting | 250.00 | 4.19 | J/g°C. | 21.24 | | 22.22 |
| m | Water added | 0.00 | 4.19 | J/g°C. | 77.03 | | 0.00 |
| n | Plastic Dewar liner | 30.00 | 2.10 | J/g°C. | 27.84 | | 1.75 |
| o | Glass, 1/2 Dewar vacuum liner | 89.00 | 0.98 | J/g°C. | 27.84 | | 2.43 |
| p | | | | | | 14.67 | 26.40 |
| | Evaporation | | | | | | |
| | Electrolyte beginning | 250.00 | | | | | |
| | Water added | 0.00 | | | | | |
| | Electrolite left | 198.82 | | | | | |
| q | Water evaporated | 51.18 | 2260.44 | J/g | | 64.27 | 115.69 |
| | Cell Heat Losses (Open-Top Cell) | | | | | | |
| r | Dewar walls | $T_{room}$ av., °C. = 21.55 | $P_w = 0.5°(0.03245ΔT-0.036)$ (emperically determined) | | | 1.23 | 2.22 |
| s | Radiant loss, top | $T_b$ av., °C. = 95.53 | $e = 2.04 \times 10^{-0}$ J/hr-cm$^2$-°R$^4$, top dia. = 7 cm | | | 2.38 | 4.28 |
| t | Convection loss, top | $T_b$ av., °C. = 95.36 | h = 3.37 J/hr-cm$^2$-°C. | | | 2.77 | 4.99 |
| u | | | | | | 6.39 | 11.49 |
| v | Electrolysis | 1.46 V × 0.519 H$_2$ gas: 0.120 | amp-hr = 0.76 watt-hr cm$^3$/s | | | 0.00 | 0.00 |
| w | | | Total Power/Energy Out: | | | 85.33 | 153.59 |
| x | | | Excess Heat: | | | 0.69 | 1.25 |
| y | | | Excess Energy/Power & Efficiency: | | | 0.82% | 100.82% |

TABLE 1

Explanation of Rows and Columns in the MultiCell Run Spreadsheets

| Row or Column | Description |
|---|---|
| Columns a through j are recorded data during the run | |
| a. and b. | Time in minutes (or duration in hours since run started) when data was read. |
| c. | Voltage as read by voltage metering 50 FIG 8 in Clarke-Hess ® Meter 53. The voltage during the runs is essentially held constant after initial startup of the run. |
| d. | Current shown in this column is calculated by dividing column i. by column c and is the "true" current that is consumed and produces heat. The Clarke-Hess ® also calculates a RMS or reactance current which is generally higher than the "true" current. This is because (1) the reactor, the power supply, and the test equipment contain high capacitance and inductance that respond to the changing resistance due to gas bubbling and boiling at the cathode and anode and (2) the way RMS is calculated for a pulsing system due to the gas bubbling and boiling at the cathode and anode. In either case, reactive current is not "true" current since it not heat producing nor is it consumed. (Also see k.) |
| e. and f. | Temperature of electrolyte bath 45 as sensed by thermistor 40 and read in kohm by ohmmeter 41. Column f is temperature represented by measured resistance. Calibrated to ice and boiling water. |

TABLE 1-continued

Explanation of Rows and Columns in the MultiCell Run Spreadsheets

| Row or Column | Description |
| --- | --- |
| g. and h. | Temperature of polypropylene liner 47 and inner of Dewar bottle 46 as sensed by thermistor 42 and read in kohm by ohmmeter 43. Column f is temperature represented by measured resistance. Calibrated to ice and boiling water. |
| k. | Electrical power read by true wattage metering 51 in the Clarke-Hess ® Meter 53. Meter reads both volts and amps to give true power in watts independent of waveform, etc. Meter integrates voltage and amperage spikes up to seven times the average readings and then integrates and calculates these into true power reading. The meter can integrate frequency, change, or harmonics from DC up to several hundred kilohertz to internally calculated true power readings. The Clarke-Hess wattmeters cover the frequency range from DC to over 1000 kHz. These instruments have wide voltage and current ranges and are able to make precise measurements under difficult signal conditions. Typically, most wattmeters (sometimes called "power analyzers") have very poor performance at high frequencies and/or low power factors. The Clarke-Hess wattmeters overcome these problems. Customers of the Clarke-Hess wattmeters include NIST, I.B.M., General Electric, Philips, Underwriter's Laboratories, the Canadian Standards Associated, Branson Ultrasonics and General Motors as well as most of the computer, aircraft, telephone, power supply, electric locomotive, transformer, ferrite, fluorescent lamp and lamp ballast, ultrasonics, and motor control companies throughout the world. They also included companies that needed to measure the loss in iron core or ferrite components, the loss in electronic lamp ballasts, the loss in capacitors, or the power in any sort of distorted, low power factor, or broadband wave-shape. |
| j. | Energy inputted into the MultiCell calculated from average power (column j) for the minute ending. |

The following are definitions of Rows k through y

| | |
| --- | --- |
| k. | The average power and total energy delivered to the MultiCell is calculated in this row. Total energy is calculated first, which is a summation of column j. The power is the average delivered during the run, which is calculated from the total energy and duration of run. |
| l. | This row calculates the amount of heat required to heat the electrolyte bath 45 from the starting bath temperature to its final temperature as shown in column f. |
| m. | Some experiments have water added (at room temperature) to replace water evaporated as the run progresses. This calculates the heat required to raise this water to final temperature. |
| n. | This calculates the heat required to raise the polypropylene liner 47 from its initial temperature to its final temperature as shown in column h. |
| o. | This calculates the heat required to raise the inner glass wall of the Dewar bottle 46 from its initial temperature to its final temperature as shown in column h. |
| n. and o. | The heat capacity and calculation of Rows o and p were empirically verified. A known amount of hot water was poured into a cool cell. Then the cell and water were allowed to come close to the same temperature. After accounting for heat losses through the walls (Row r) the heat capacity for the cell was determined to be 129 J/° C. which agrees with the sum of Rows n and o. |
| p. | This is the total amount of heat required to heat up the cell to final temperature. It is a summation of Rows l, m, n, o. |
| q. | This row calculates the heat required to vaporize the water evaporated or boiled from the cell. The amount of water vaporized is the amount of electrolyte bath started with when the power was turned on - water added during run - the amount of water left in cell when the electrical power was turned off. |
| r. | This calculates the heat lost through the walls of the container 44. This was empirically determined by placing a heater in a closed cell until the interior temperature stabilized. This was repeated at different wattages and then curve-fitted to the equation on the spreadsheet. Temperature of the room is also measured by a thermistor and recorded here and used in calculations. |
| s. | This calculates radiant heat loss from the top of the container per the equation on the spreadsheet. The radiant temperature shown is calculated in a separate column (not shown) which is weighted differently than a standard average since radiant heat transfer is to the $4^{th}$ power. The container has an open top during entire run. The open top is 7 cm in diameter. |
| t. | This calculates convection heat loss from the top of the container per the equation on the spreadsheet. The average temperature shown is calculated in a separate column (not shown). |
| s. and t. | The amount of heat loss through the open top of the cell, which is the sum of radiant loss (Row s) and convection loss (Row t), was empirically determined. Molten wax and a heater were placed in the cell and the temperature was allowed to stabilize. This was done at different wattages. There was no evaporation term since the wax did not evaporate. The empirical results were similar to the sum-calculated radiant (Row s) and convection (Row t) losses. |
| u. | Total losses through the cell which is the sum of Rows r, s, and t. |
| v. | Electrolysis losses. Electrolysis produces hydrogen. This hydrogen can be burned to produce heat. Therefore, the heat that would be produced if the hydrogen were burned should be counted. It can be shown that the amount of hydrogen produced is related to the amperage and the heat gained from burning the hydrogen is related to 1.46 volts x the amp-hours of current consumed. The amp-hours are calculated in a separate column not shown. In the case of the control run the heat is generated from a resistance heater (in particular a submergible coffee/tea cup heater). |

TABLE 1-continued

Explanation of Rows and Columns in the MultiCell Run Spreadsheets

| Row or Column | Description |
|---|---|
| w. | The total power and energy produced is the sum of the heat required to heat up the cell (Row p) + heat to vaporize the water lost from the cell (Row q) + the heat lost through the cell (Row u), and the useful energy that can be acquired from the burning of the hydrogen (Row u). |
| x. | Excess heat is calculated by subtracting Row k from Row x. |
| y. | Percent excess heat is calculated by: (Row x/Row k) × 100%. Efficiency is calculated by: (Row w/Row k) × 100%. |

Digital multimeters (volt-amp-ohm) meters were checked against a bench-top multimeter sent away and checked against national standards. Calibration stickers of bench top meter were also up to data.

Experimental Results

Many successful test runs have been performed. Results for this Patent Application were from the latest runs with the MultiCell configuration shown in FIG. 7 using the same testing apparatus FIG. 8 used for control run described previously. The test runs produced a boiling-water (electrolyte) bath within a few minutes except Test Run 1 because of its short run time. Each run produced significantly more heat than the power that was delivered to the cell. The results of the test runs are summarized in Tables 2 and 3. The best performing run (Run 6) produced 40.14 watts of heat from 13.52 watts of electricity. This equates to an efficiency of 415%. A detailed spreadsheet is given for this test run in Exhibit 2.

The highest heat-producing run was Run 2. (Run 1 produced more watts but it shorted out early in the run.) A detailed spreadsheet for this run is shown in Exhibit 3. The MultiCell produced a large amount of power (108 watts, average) for its small size of approximately 1.8 cm$^2$ by 0.05 cm thick. The heat emitted at the cathode was an average of 680 watts/cm$^2$. There were times it may have been over 1000 watts/cm$^2$. The high heat and fluxes probably contributed to the shorter life seen with the more efficient runs. The most frequent cathode failures were when the cathode melted into two pieces at the base. The inventor has ideas on how to prevent this.

Test results show the Invention (MultiCell) to be a successful concept and design. The Invention showed very efficient heating at boiling-water temperatures. Production of the efficient heating appeared quickly after application of electrical power. It could not be determined if it was immediate because the high capacitance of the power supply acted as a short and the voltage could only be turned up over a span of about 60 seconds. The multiple test runs show repeatability of results for the MultiCell design using common electrolytes (e.g. $K_2CO_3$) and normal water. $Li_2SO_4$ was used in earlier runs with a different configuration than presented in this application. These runs produced more than parity but where less efficient than those presented in this patent application. Increased life of the cell, higher efficiency, and the construction of plurality/clustered cells will be the focus of future research.

TABLE 2

TEST RUN DESCRIPTION

| Run No. | Electrolyte Bath 45 FIG. 8 | Cathode Material | Con-figuration | Comments |
|---|---|---|---|---|
| 1 | 250 m$^3$ 0.5 M $K_2CO_3$ (Pure, Goldstein's, San Francisco.) | Tungsten. 0.5 mm diameter wire, 12 mm long. (Alfa ⁕sar ®. 99.95% pure. Stock No 10409. Lot No. F07J20). Measured closer to 0.6 mm diameter. | FIG. 7 Position 32. 2 mm gap. | Vigorous boiling. Blue glow. Cathode melted the base from 32 to 33 FIG. 7. |
| 2 | 250 m$^3$ 0.5 M $K_2CO_3$ (Same Specs.) | Tungsten, 0.5-mm diameter, wire, 10 mm long. (Specification same above). | FIG. 7 Position 36. 3.5 gap offset. | Blue glow. Pt on cathode. Cathode fragmented away. |
| 3 | 250 m$^3$ 0.5 M $K_2CO_3$ (Same Specs.) | Tungsten, 0.5 mm diameter. 10 mm long. (Specification same above). | FIG. 7 Position 36. 3.5 gap offset. | Blue glow. Cathode fragmented away. |
| 4 | 250 m$^3$ 0.5 M $K_2CO_3$ (Same Specs.) | Nickel, 0.5 mm diameter wire, 10 mm long. (Alfa ⁕sar ®. 99.95% pure. Stock No. 10250. Lot No. G06E09). Measured closer to 0.55 mm diameter. | FIG. 7 Position 36. 3.5 gap offset. | Blue glow. Cathode melted in two, fell, and melted into shell 47 FIG. 8 |
| 5 | 250 m$^3$ 0.5 M $K_2CO_3$ (Same Specs.) | Platinum, 0.508 mm diameter. 10 mm long (ISA Standard Grade Thermo-couple wire Type R and S) | FIG. 7 Position 36. 3.5 gap offset. | Blue glow. Less vigorous boiling but frequent white flashes. Cathode in good condition after run. |

TABLE 3

TEST RUNS ENERGY BALANCE

| | | | | Power Losses, watts | | | | | |
|---|---|---|---|---|---|---|---|---|---|
| Run No. | Duration Minutes | Volts average | Power In Watts | Heat up | Evaporation | Cell losses | Electrolysis | Power Out Watts | Efficiency % |
| 1 | 2  | 89  | 90.75 | 172.53 | Nm    | 1.10 | 2.15 | 175.79 | 193.70 |
| 2 | 17 | 126 | 28.84 | 62.06  | 40.02 | 5.46 | 0.33 | 107.87 | 374.06 |
| 3 | 26 | 117 | 26.44 | 47.81  | 32.30 | 4.86 | 0.33 | 85.30  | 322.57 |
| 4 | 18 | 133 | 32.82 | 72.22  | 27.08 | 4.93 | 0.36 | 104.60 | 318.68 |
| 5 | 60 | 132 | 13.52 | 23.01  | 27.76 | 5.21 | 0.15 | 42.62  | 415.30 | nm = not measured

EXHIBIT 2

Part A
MultiCell Run
(part a)

Date: 05/08/00
Description: MultiCell - 0.4 to 0.5 mm dia × 10 mm platinum, 5 mm offset w/2 mm gap, 3-wire anode, 0.5 M $K_2CO_3$

| a | b | c | d | e | f | g | h | i | j | |
|---|---|---|---|---|---|---|---|---|---|---|
| Time Minutes | Time Hours | Voltage V | Current A | T bath kohms | T bath °C. | T Shell kohms | T Shell °C. | Power in W, aver. | Energy in kJ | Comments |
| 0.00  | 0.00 | 0.00   | 0.00 | 12.28 | 19.60 | 12.17 | 19.83 | 0.00  | 0.00 | |
| 1.00  | 0.02 | 132.00 | 0.23 | 7.60  | 32.49 | 12.04 | 20.11 | 30.00 | 0.90 | Yellow glow. Then |
| 2.00  | 0.03 | 130.00 | 0.08 | 6.21  | 38.18 | 11.32 | 21.73 | 11.00 | 1.23 | blue glow. |
| 3.00  | 0.05 | 132.00 | 0.15 | 5.16  | 43.56 | 11.44 | 21.46 | 20.00 | 0.93 | Frequent bright |
| 4.00  | 0.07 | 132.00 | 0.11 | 4.38  | 48.59 | 10.86 | 23.32 | 15.00 | 1.05 | white flashes. |
| 5.00  | 0.08 | 131.50 | 0.15 | 3.86  | 52.31 | 9.99  | 25.03 | 20.00 | 1.05 | |
| 6.00  | 0.10 | 131.50 | 0.15 | 3.54  | 54.97 | 9.24  | 27.14 | 20.00 | 1.20 | |
| 7.00  | 0.12 | 132.10 | 0.11 | 3.14  | 58.77 | 8.24  | 30.24 | 15.00 | 1.05 | |
| 8.00  | 0.13 | 132.00 | 0.09 | 2.75  | 63.05 | 6.80  | 35.59 | 12.00 | 0.81 | |
| 9.00  | 0.15 | 132.00 | 0.09 | 2.69  | 63.76 | 6.32  | 37.68 | 12.00 | 0.72 | |
| 10.00 | 0.17 | 138.90 | 0.06 | 2.35  | 68.23 | 5.00  | 44.48 | 8.00  | 0.60 | |
| 11.00 | 0.18 | 132.80 | 0.05 | 2.25  | 69.69 | 4.40  | 48.32 | 6.00  | 0.42 | |
| 12.00 | 0.20 | 132.10 | 0.04 | 2.11  | 71.86 | 3.68  | 53.78 | 5.00  | 0.33 | |
| 13.00 | 0.22 | 132.00 | 0.03 | 2.00  | 73.68 | 3.25  | 57.68 | 4.00  | 0.27 | |
| 14.00 | 0.23 | 131.00 | 0.11 | 1.86  | 76.19 | 2.65  | 64.25 | 15.00 | 0.57 | |
| 15.00 | 0.25 | 132.00 | 0.04 | 1.79  | 77.54 | 2.36  | 68.09 | 5.00  | 0.60 | |
| 16.00 | 0.27 | 134.00 | 0.07 | 1.73  | 78.74 | 2.21  | 70.29 | 9.00  | 0.42 | |
| 17.00 | 0.28 | 134.00 | 0.04 | 1.67  | 79.98 | 2.00  | 73.68 | 5.00  | 0.42 | |
| 18.00 | 0.30 | 133.00 | 0.03 | 1.62  | 81.06 | 1.94  | 74.72 | 4.50  | 0.29 | |
| 19.00 | 0.32 | 133.00 | 0.07 | 1.56  | 82.41 | 1.80  | 77.34 | 9.00  | 0.41 | Cell calming down. |
| 20.00 | 0.33 | 133.20 | 0.04 | 1.54  | 82.87 | 1.77  | 77.93 | 5.00  | 0.42 | Flashes less. |
| 21.00 | 0.35 | 133.60 | 0.07 | 1.52  | 83.34 | 1.73  | 78.74 | 10.00 | 0.45 | Vac = 98.3 |
| 22.00 | 0.37 | 132.20 | 0.11 | 1.51  | 83.58 | 1.68  | 79.77 | 14.00 | 0.72 | |
| 23.00 | 0.38 | 132.50 | 0.08 | 1.50  | 83.81 | 1.65  | 80.41 | 11.00 | 0.75 | |
| 24.00 | 0.40 | 132.80 | 0.11 | 1.48  | 84.29 | 1.61  | 81.29 | 14.00 | 0.75 | |
| 25.00 | 0.42 | 132.00 | 0.11 | 1.46  | 84.78 | 1.59  | 81.73 | 14.00 | 0.84 | |
| 26.00 | 0.43 | 131.40 | 0.09 | 1.47  | 84.54 | 1.56  | 82.41 | 12.00 | 0.78 | |
| 27.00 | 0.45 | 131.80 | 0.11 | 1.45  | 85.06 | 1.54  | 82.87 | 14.00 | 0.78 | |
| 28.00 | 0.47 | 131.20 | 0.11 | 1.44  | 85.63 | 1.53  | 83.11 | 15.00 | 0.87 | |
| 29.00 | 0.48 | 131.60 | 0.11 | 1.44  | 85.63 | 1.52  | 83.34 | 14.00 | 0.87 | |
| 30.00 | 0.50 | 132.80 | 0.11 | 1.43  | 86.21 | 1.50  | 83.81 | 14.00 | 0.84 | |
| 31.00 | 0.52 | 131.60 | 0.11 | 1.42  | 86.79 | 1.49  | 84.05 | 14.00 | 0.84 | |
| 32.00 | 0.53 | 131.20 | 0.13 | 1.42  | 86.79 | 1.49  | 84.05 | 17.00 | 0.93 | |
| 33.00 | 0.55 | 131.40 | 0.12 | 1.42  | 86.79 | 1.48  | 84.29 | 16.00 | 0.99 | |
| 34.00 | 0.57 | 132.00 | 0.11 | 1.42  | 86.79 | 1.47  | 84.54 | 15.00 | 0.93 | |
| 35.00 | 0.58 | 132.10 | 0.11 | 1.41  | 87.37 | 1.47  | 84.54 | 15.00 | 0.90 | |
| 36.00 | 0.60 | 132.30 | 0.10 | 1.41  | 87.37 | 1.46  | 84.78 | 13.00 | 0.84 | |
| 37.00 | 0.62 | 131.50 | 0.11 | 1.41  | 87.37 | 1.46  | 84.78 | 15.00 | 0.84 | |
| 38.00 | 0.63 | 131.50 | 0.11 | 1.40  | 87.96 | 1.45  | 85.06 | 15.00 | 0.90 | |
| 39.00 | 0.65 | 131.70 | 0.11 | 1.41  | 87.37 | 1.45  | 85.06 | 15.00 | 0.90 | |
| 40.00 | 0.67 | 131.50 | 0.12 | 1.41  | 87.37 | 1.45  | 85.06 | 16.00 | 0.93 | |
| 41.00 | 0.68 | 131.40 | 0.11 | 1.40  | 87.96 | 1.45  | 85.06 | 15.00 | 0.93 | |
| 42.00 | 0.70 | 131.30 | 0.11 | 1.40  | 87.96 | 1.45  | 85.06 | 15.00 | 0.90 | |
| 43.00 | 0.72 | 132.20 | 0.11 | 1.39  | 88.56 | 1.44  | 85.63 | 15.00 | 0.90 | |
| 44.00 | 0.73 | 131.60 | 0.11 | 1.39  | 88.56 | 1.44  | 85.63 | 15.00 | 0.90 | |
| 45.00 | 0.75 | 131.40 | 0.12 | 1.39  | 88.56 | 1.43  | 86.21 | 16.00 | 0.93 | |
| 46.00 | 0.77 | 131.60 | 0.11 | 1.39  | 88.56 | 1.43  | 86.21 | 15.00 | 0.93 | |
| 47.00 | 0.78 | 131.50 | 0.11 | 1.39  | 88.56 | 1.43  | 86.21 | 15.00 | 0.90 | |
| 48.00 | 0.80 | 131.50 | 0.13 | 1.41  | 87.37 | 1.43  | 88.21 | 17.00 | 0.96 | |
| 49.00 | 0.82 | 131.20 | 0.11 | 1.39  | 88.56 | 1.43  | 86.21 | 15.00 | 0.96 | |

EXHIBIT 2-continued

Part A
MultiCell Run
(part a)

Date: 05/08/00
Description: MultiCell - 0.4 to 0.5 mm dia × 10 mm platinum, 5 mm offset w/2 mm gap, 3-wire anode, 0.5 M $K_2CO_3$

|   | a<br>Time<br>Minutes | b<br>Time<br>Hours | c<br>Voltage<br>V | d<br>Current<br>A | e<br>T bath<br>kohms | f<br>T bath<br>° C. | g<br>T Shell<br>kohms | h<br>T Shell<br>° C. | i<br>Power in<br>W, aver. | j<br>Energy in<br>kJ | Comments |
|---|---|---|---|---|---|---|---|---|---|---|---|
|   | 50.00 | 0.83 | 132.40 | 0.11 | 1.38 | 89.16 | 1.43 | 86.21 | 14.00 | 0.87 | |
|   | 51.00 | 0.85 | 131.40 | 0.12 | 1.38 | 89.16 | 1.43 | 86.21 | 16.00 | 0.90 | |
|   | 52.00 | 0.87 | 131.90 | 0.11 | 1.38 | 89.16 | 1.43 | 86.21 | 15.00 | 0.93 | |
|   | 53.00 | 0.88 | 130.80 | 0.11 | 1.38 | 89.16 | 1.42 | 86.79 | 15.00 | 0.90 | |
|   | 54.00 | 0.90 | 131.20 | 0.11 | 1.38 | 89.16 | 1.42 | 86.79 | 15.00 | 0.90 | |
|   | 55.00 | 0.92 | 131.20 | 0.12 | 1.38 | 89.16 | 1.42 | 86.79 | 16.00 | 0.93 | |
|   | 56.00 | 0.93 | 130.90 | 0.12 | 1.38 | 89.16 | 1.42 | 86.79 | 16.00 | 0.96 | |
|   | 57.00 | 0.95 | 130.80 | 0.11 | 1.38 | 89.16 | 1.42 | 86.79 | 15.00 | 0.93 | |
|   | 58.00 | 0.97 | 131.20 | 0.11 | 1.38 | 89.18 | 1.42 | 86.79 | 15.00 | 0.90 | |
|   | 59.00 | 0.98 | 130.90 | 0.11 | 1.38 | 89.16 | 1.42 | 86.79 | 15.00 | 0.90 | Cathode remains in |
|   | 60.00 | 1.00 | 130.80 | 0.11 | 1.38 | 89.16 | 1.42 | 86.79 | 15.00 | 0.90 | good shape. |
| k | Total Power/Energy In: | | | | | | | | 13.52 | 48.66 | |

EXHIBIT 2

Part B
MultiCell Run
(part b)

Date: 05/08/00
Description: MultiCell - 0.4 to 0.5 mm dia × 10 mm platinum, 5 mm offset w/2 mm gap, 3-wire anode, 0.5 M $K_2CO_3$

|   |   |   | Mass<br>g | $C_p$ or<br>h (evap) | Units | ΔT<br>° C. | Power Out<br>W, aver. | Energy Out<br>kJ |
|---|---|---|---|---|---|---|---|---|
|   | Heat up | | | | | | | |
| l | Electrolyte-Starting | | 250.00 | 4.19 | J/g° C. | 69.56 | | 72.79 |
| m | Water added | | 0.00 | 4.19 | J/g° C. | 66.66 | | 0.00 |
| n | Plastic Dewar liner | | 30.00 | 2.10 | J/g° C. | 66.96 | | 4.22 |
| o | Glass, 1/2 Dewar vacuum liner | | 89.00 | 0.98 | J/g° C. | 66.96 | | 5.84 |
| p | | | | | | | 23.01 | 82.85 |
|   | Evaporation | | | | | | | |
|   | Electrolyte beginning | | 250.00 | | | | | |
|   | Water added | | 0.00 | | | | | |
|   | Electrolite left | | 205.79 | | | | | |
| q | Water evaporated | | 44.21 | 2260.44 | J/g | | 27.76 | 99.93 |
|   | Cell Heat Losses (Open-Top Cell) | | | | | | | |
| r | Dewar walls | $T_{room}$ av., ° C. = 22.50 | $P_w = 0.5^0(0.03245ΔT-0.036)$<br>(emperically determined) | | | | 1.06 | 3.83 |
| s | Radiant loss, top | $T_b$ av., ° C. = 80.64 | $e = 2.04 × 10^{-9}$ J/hr-$cm^2$-$R^4$,<br>top dia. = 7 cm | | | | 1.75 | 6.29 |
| t | Convection loss, top | $T_b$ av., ° C. = 79.87 | h = 3.37 J/hr-$cm^2$-° C. | | | | 2.40 | 8.64 |
| u | | | | | | | 5.21 | 18.76 |
| v | Electrolysis | 1.46 V × 0.104<br>$H_2$ gas: 0.012 | | amp-hr = 0.15 watt-hr<br>$cm^3$/s | | | 0.15 | 0.54 |
| w | | | | | Total Power/Energy Out: | | 56.14 | 202.09 |
| x | | | | | Excess Heat: | | 42.62 | 153.43 |
| y | | | | | Excess Energy/Power & Efficiency: | | 315.30% | 415.30% |

EXHIBIT 3

MultiCell Run

Date: 04/02/00
Description: MultiCell - 0.5 mm dia × 15 mm Tungsten, 5 mm offset w/2 mm gap, 3-wire anode, 0.5 M $K_2CO_3$

| | a | b | c | d | e | f | g | h | i | j | |
|---|---|---|---|---|---|---|---|---|---|---|---|
| | Time Minutes | Time Hours | Voltage V | Current A | T bath kohms | T bath °C. | T Shell kohms | T Shell °C. | Power in W, aver. | Energy in kJ | Comments |
| | 0.00 | 0.00 | 0.00 | 0.00 | 6.25 | 37.99 | 7.88 | 31.48 | 0.00 | 0.00 | Cathode reused - |
| | 1.00 | 0.02 | 121.30 | 1.43 | — | 47.99 | — | 40.57 | 174.00 | 5.22 | Previously shorted. |
| | 2.00 | 0.03 | 131.00 | 0.79 | 3.22 | 57.98 | 4.21 | 49.65 | 104.00 | 8.34 | Some damage. |
| | 3.00 | 0.05 | 133.00 | 0.47 | 2.41 | 67.39 | 2.81 | 62.35 | 62.00 | 4.98 | May have Pt on it. |
| | 4.00 | 0.07 | 134.00 | 0.15 | 1.37 | 89.76 | 2.17 | 70.91 | 20.00 | 2.46 | Cathode & bath |
| | 5.00 | 0.08 | 134.00 | 0.10 | — | 86.09 | — | 73.93 | 13.00 | 0.99 | glow blue. |
| | 6.00 | 0.10 | 134.00 | 0.10 | 1.56 | 82.41 | 1.82 | 76.95 | 13.00 | 0.78 | |
| | 7.00 | 0.12 | 134.00 | 0.13 | 1.48 | 84.29 | 1.70 | 79.35 | 17.00 | 0.90 | |
| | 8.00 | 0.13 | 135.00 | 0.10 | 1.34 | 90.46 | 1.50 | 83.81 | 14.00 | 0.93 | |
| | 9.00 | 0.15 | 135.00 | 0.12 | 1.35 | 90.28 | 1.54 | 82.87 | 16.00 | 0.90 | |
| | 10.00 | 0.17 | 135.00 | 0.07 | 1.32 | 90.82 | 1.46 | 84.78 | 10.00 | 0.76 | |
| | 11.00 | 0.18 | 135.00 | 0.04 | 1.31 | 91.00 | 1.42 | 86.79 | 6.00 | 0.48 | |
| | 12.00 | 0.20 | 135.00 | 0.04 | 1.31 | 91.00 | 1.40 | 87.96 | 5.00 | 0.33 | |
| | 13.00 | 0.22 | 135.00 | 0.07 | 1.31 | 91.00 | 1.38 | 89.16 | 10.00 | 0.45 | |
| | 14.00 | 0.23 | 135.20 | 0.07 | 1.32 | 90.82 | 1.38 | 89.16 | 10.00 | 0.80 | |
| | 15.00 | 0.25 | 135.20 | 0.07 | 1.33 | 90.64 | 1.39 | 88.56 | 9.50 | 0.59 | |
| | 16.00 | 0.27 | 135.00 | 0.03 | 1.34 | 90.46 | 1.40 | 87.96 | 4.50 | 0.42 | |
| | 17.00 | 0.28 | 135.00 | 0.03 | 1.34 | 90.46 | 1.41 | 87.37 | 4.50 | 0.27 | Cathode gone. |
| k | Total Power/Energy In: | | | | | | | | 28.84 | 29.42 | |

| | | | Mass g | $C_p$ or h (evap) | Units | ΔT °C. | Power Out W, aver. | Energy Out kJ |
|---|---|---|---|---|---|---|---|---|
| | Heat up | | | | | | | |
| l | Electrolyte-Starting | | 250.00 | 4.19 | J/g° C. | 52.46 | | 54.90 |
| m | Water added | | 0.00 | 4.19 | J/g° C. | 68.46 | | 0.00 |
| n | Plastic Dewar liner | | 30.00 | 2.10 | J/g° C. | 55.89 | | 3.52 |
| o | Glass, 1/2 Dewar vacuum liner | | 89.00 | 0.98 | J/g° C. | 55.89 | | 4.87 |
| p | | | | | | | 62.06 | 63.30 |
| | Evaporation | | | | | | | |
| | Electrolyte beginning | | 250.00 | | | | | |
| | Water added | | 0.00 | | | | | |
| | Electrolite left | | 231.94 | | | | | |
| q | Water evaporated | | 18.06 | 2260.44 | J/g | | 40.02 | 40.82 |
| | Cell Heat Losses (Open-Top Cell) | | | | | | | |
| r | Dewar walls | $T_{room}$ av., ° C. = 22.00 | $P_w = 0.5^0(0.03245\Delta T$-$0.036)$ (emperically determined) | | | | 1.09 | 1.11 |
| s | Radiant loss, top | $T_b$ av., ° C. = 84.34 | $e = 2.04 \times 10^{-0}$ J/hr-$cm^2$-$R^4$, top dia. = 7 cm | | | | 1.90 | 1.94 |
| t | Convection loss, top | $T_b$ av., ° C. = 83.70 | h = 3.37 J/hr-$cm^2$-° C. | | | | 2.47 | 2.51 |
| u | | | | | | | 5.46 | 5.57 |
| v | Electrolysis | 1.46 V × 0.064 $H_2$ gas: 0.026 | amp-hr = 0.09 watt-hr $cm^3$/s | | | | 0.33 | 0.34 |
| w | | | Total Power/Energy Out: | | | | 107.87 | 110.03 |
| x | | | Excess Heat: | | | | 79.03 | 80.61 |
| y | | | Excess Energy/Power & Efficiency: | | | | 274.06% | 374.06% |

What is claimed:

1. An electrolytic cell unit, for increasing electron flow, proton/deuteron fluxes and overpotential in boundary layers at the cathode surface, comprising:
    a proton/deuteron conductive media;
    a cathode, having a surface area not exceeding approximately 0.25 square centimeters and not exceeding approximately 0.5 mm in thickness, immersed in the conductive media;
    an anode having a surface area greater than the cathode, immersed in the conductive media, with a gap between the cathode and anode of approximately two millimeters; and
    an insulator disposed between the anode and cathode materials to prevent contact thereof and maintain the gap.

2. The electrolytic cell as recited in claim 1, wherein the cathode is made of material, having a thickness significantly less than 0.5 mm, to encourage flow of electron and proton/deuteron fluxes in the boundry layers and at the surface of the cathode.

3. The electrolytic cell unit as recited in claim 1, wherein:
    the anode area is distributed around an open central area; and the cathode is centrally positioned within the open central area, thereby tending to reduce resistance of the cell unit.

4. The electrolytic cell unit as recited in claim 1, wherein the surface area of the anode is more than twice that of the cathode, thereby tending to further reduce the resistance of the cell unit.

5. The electrolytic cell unit as recited in claim 1, where the gap is significantly less than two millimeters, thereby tending to reduce the resistance of the cell unit.

6. The electrolytic cell unit as recited in claim 1, wherein the cathode area is significantly less than 0.25 square centimeters.

7. An electrolytic plasma cell unit, for increasing electron flow and proton/deuteron fluxes and increased overpotential in boundary layers at the cathode surface, comprising:
a proton/deuteron conductive media;
a cathode having a surface area significantly less than 0.25 sq. cm. immersed in the proton/deuteron conductive media;
an anode submersed in the proton/deuteron conductive media and having a large surface area relative to the cathode;
a gap of no more than 4 mm between the cathode and anode;
an insulator disposed between the anode and cathode to prevent contact therebetween and maintain the gap; and
a voltage differential of at least 50 volts imposed across the anode and cathode so as to iniate a plasma at the cathode surface and create a voltage drop through the cathode boundary layers, with a consequent overpotential condition.

8. The electrolytic cell unit as recited in claim 1, wherein the cathode comprises thin layers of metals chosen from a group consisting essentially of Pd, Ni, Au and Ti, and alloys and compounds of Pd, Ni, Au and Ti.

9. An electrolytic reactor according to claim 1 wherein the cathode surface comprises thin metallic layers overlying a base layer chosen from a group consisting essentially of Cu, Ag, and Pt and alloys and compounds of Cu, Ag, and Pt.

10. An electrolytic reactor according to claim 1 wherein the cathode surface further comprises discontinuities that effectively create an increased amount of edges and focal points.

11. An electrolytic reactor according to claim 1 wherein the cathodes are formed of separate deposits of dissimilar materials.

12. An electrolytic reactor according to claim 9 wherein the cathodes are formed of thin layers of dissimilar materials.

13. An electrolytic reactor according to claim 9 wherein the separate deposits of dissimilar materials overlay a base layer.

14. An electrolytic reactor according to claim 1 wherein:
the cathodes are of uniform size and shape and evenly dispersed within the anode area; and
the gaps between each cathode and the common anode are uniform.

15. An electrolytic reactor comprising:
a proton/deuteron conductive media;
a nonconductive substrate;
a plurality of cathodes having an aggregate surface area, immersed in the conductive media and affixed to the nonconductive substrate;
an anode immersed in the conductive media, where it is also affixed to the nonconductive substrate, the anode having a surface area greater than the aggregate cathode area, with a cathode receiving aperture for each cathode, the apertures being sized and arranged to provide a gap between the cathode and each anode of approximately two millimeters;
a common negative (−) lead connected to, and terminating, the plurality of cathodes;
a common positive (+) lead connected to, and terminating the anode; and
means for applying a voltage potential of up to 50 volts across the positive and negative leads.

16. The electrolytic reactor as recited in claim 15, wherein the cathode surface further comprises discontinuities that effectively create an increased amount of edges and focal points.

17. An electrolytic reactor according to claim 15 wherein the cathodes are formed of separate deposits of dissimilar materials.

18. An electrolytic reactor according to claim 15 wherein the cathodes are formed of thin layers of dissimilar materials.

19. An electrolytic reactor according to claim 17 wherein the separate deposits of dissimilar materials overlay a base layer.

20. A method for making an electrolytic reactor comprising the steps of:
providing a proton/deuteron conductive media;
providing one or more non-conductive substrate sheets;
affixing an anode layer having a plurality of uniformly spaced cathode receiving apertures to each substrate sheet;
affixing cathodes of uniform surface area at the center of each aperture; on each of the one or more non-conductive substrate sheets, so that the sheet aggregate cathode area is less than the sheet anode area and a uniform gap is provided between the cathodes and the anode;
immersing the one or more non-conductive substrate sheets in the conductive media;
connecting a common negative (−) lead to, and terminating, all of the cathodes; and
connecting a common positive (+) lead to, and terminating all of the anodes.

21. The method according to claim 20 and further including the step of forming the cathodes as a plurality of layers of dissimilar materials.

22. The method according to claim 20 and further including the step of imposing a voltage differential across the anode and cathode terminal leads so as to create proton/deuteron fluxes at the cathode surface and a voltage drop through the cathode boundary layers, with a consequent overpotential.

23. The method according to claim 20 wherein affixing includes the steps of:
formulating a metal compound solution as an ink;
applying the ink to the non-conductive substrate sheet in cathode and anode patterns; and
reducing the metal compound to elemental metal by application of a reductant.

24. The method of claim 23, wherein the cathodes are deposited as layers of different metal compound solutions by repeating the steps of "applying" and "reducing" for each additional layer.

25. An electrolytic reactor comprising:

a plurality of cathodes having a surface area significantly less than 0.25 sq cm (each), immersed in the proton/deuteron conductive media, and having a large surface area relative to the cathode area, a gap of no more than 4 mm between each cathode and anode;

an insulator disposed between the anode and cathode to prevent contact therebetween and maintain the gap; and a common negative (−) lead connected to, and terminating, the plurality of cathodes;

a common positive (+) lead connected to, and terminating the plurality of anodes; and means for applying a voltage potential of at least 50 volts across the anode and cathode leads.

* * * * *